(12) United States Patent
Chao

(10) Patent No.: US 8,079,787 B2
(45) Date of Patent: Dec. 20, 2011

(54) HOLE SAW

(75) Inventor: Walley Chao, Nantou County (TW)

(73) Assignee: K & W Tools Co., Ltd., Nantou (TW)

( * ) Notice: Subject to any disclaimer, the term of this patent is extended or adjusted under 35 U.S.C. 154(b) by 769 days.

(21) Appl. No.: 12/208,488

(22) Filed: Sep. 11, 2008

(65) Prior Publication Data

US 2009/0214310 A1 Aug. 27, 2009

(30) Foreign Application Priority Data

Feb. 22, 2008 (TW) ................................ 97203182 U

(51) Int. Cl.
  *B23B 51/00* (2006.01)
  *B23B 51/05* (2006.01)
(52) U.S. Cl. ........ 408/206; 408/204; 408/197; 408/231; 408/239 R
(58) Field of Classification Search .................... 279/89, 279/90, 91; 403/109.3, 109.8, 318, 327, 403/328, 362; 408/191, 196, 204, 197, 226, 408/229, 231, 232, 233, 713, 203.5, 238, 408/239 R, 206
See application file for complete search history.

(56) References Cited

U.S. PATENT DOCUMENTS

| | | | | |
|---|---|---|---|---|
| 3,064,503 A | * | 11/1962 | Fry ................................ | 408/232 |
| 3,647,310 A | * | 3/1972 | Morse ........................ | 408/239 R |
| 3,784,316 A | * | 1/1974 | Bittern .......................... | 408/204 |
| 4,050,842 A | * | 9/1977 | Janin ............................. | 408/226 |
| 4,303,357 A | * | 12/1981 | Makar ........................... | 408/204 |
| 4,986,690 A | * | 1/1991 | Cooksey ....................... | 403/319 |
| 5,108,235 A | * | 4/1992 | Czyzewski .................... | 408/204 |
| 5,407,293 A | * | 4/1995 | Crainich ..................... | 403/322.1 |
| 6,126,359 A | * | 10/2000 | Dittrich et al. ............... | 403/349 |
| 6,254,303 B1 | * | 7/2001 | Falat et al. ..................... | 403/348 |
| 6,409,436 B1 | * | 6/2002 | Despres .......................... | 408/68 |
| 6,705,807 B1 | * | 3/2004 | Rudolph et al. ............. | 408/1 R |
| 7,073,992 B2 | * | 7/2006 | Korb et al. .................... | 408/204 |

* cited by examiner

*Primary Examiner* — David Bryant
*Assistant Examiner* — Paul M Janeski
(74) *Attorney, Agent, or Firm* — Browdy and Neimark, PLLC

(57) ABSTRACT

A hole saw includes an arbor, a saw blade assembly having a saw blade and an adapter connected with the saw blade and provided with a protrusion received in an indentation of the arbor, a lid movably mounted on a body portion of the arbor and movable relative to the arbor between a first position where second coupling portions of the adapter are blocked by a block portion of the lid and coupled to first coupling portions of the arbor such that the saw blade assembly can't be rotatable relative to the arbor, and a second position where the second coupling portions of the adapter are staggered with the block portion and uncoupled from the first coupling portions of the arbor through the rotation of the saw blade assembly. Thus, the hole saw has the advantages of reducing vibration in use and convenience in assembly and disassembly works.

9 Claims, 5 Drawing Sheets

HOLE SAW

BACKGROUND OF THE INVENTION

1. Field of the Invention

The present invention relates generally to a hole saw, and more specifically to a hole saw that can reduce vibration in use.

2. Description of the Related Art

A conventional hole saw mainly includes an arbor and a saw blade assembly connected with the arbor. The arbor can be driven by a driving device to drive the saw blade assembly to rotate, thereby sawing a circular hole in wood or metal.

However, the arbor and the saw blade assembly are connected with each other by means of an engagement of a positioning member, such as a steel ball, with a positioning hole. It is to be understood that the vibration may be generated in the saw blade assembly due to the unstable engagement of the positioning member with the positioning hole during rotation of the saw blade assembly, resulting in a deterioration of working accuracy.

SUMMARY OF THE INVENTION

The present invention has been accomplished in view of the above-noted circumstances. It is one objective of the present invention to provide a hole saw, which can reduce vibration in use.

It is another objective of the present invention to provide a hole saw, which can be assembled and disassembled conveniently.

To achieve these objectives of the present invention, the hole saw comprises an arbor, a saw blade assembly, a lid, and a drill. The arbor has a body portion and a coupling end connected with the body portion and provided with an indentation, a center hole in communication with the indentation, and two opposite first coupling portions at a boundary of the indentation. The saw blade assembly has a saw blade and an adapter connected with the saw blade and provided with a through hole aligned with the center hole of the arbor and a protrusion received in the indentation of the arbor with two opposite second coupling portions. The lid is provided with at least one block portion and movably mounted on the body portion of the arbor and movable relative to the arbor between a first position and a second position. The drill has one end passing through the through hole of the adapter and inserted in the center hole of the arbor.

When the lid is located at the first position, the second coupling portions of the adapter are blocked by the block portion of the lid and coupled to the first coupling portions of the arbor such that the saw blade assembly are unrotatable relative to the arbor but drivable by a driving tool through the arbor to saw a workpiece steadily, thereby reducing vibration in sawing. When the lid is located at the second position, the second coupling portions of the adapter and the block portion of the lid are staggered such that the second coupling portions of the adapter are uncoupled from the first coupling portions of the arbor through the rotation of the saw blade assembly, thereby disassembling the saw blade assembly from the arbor conveniently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
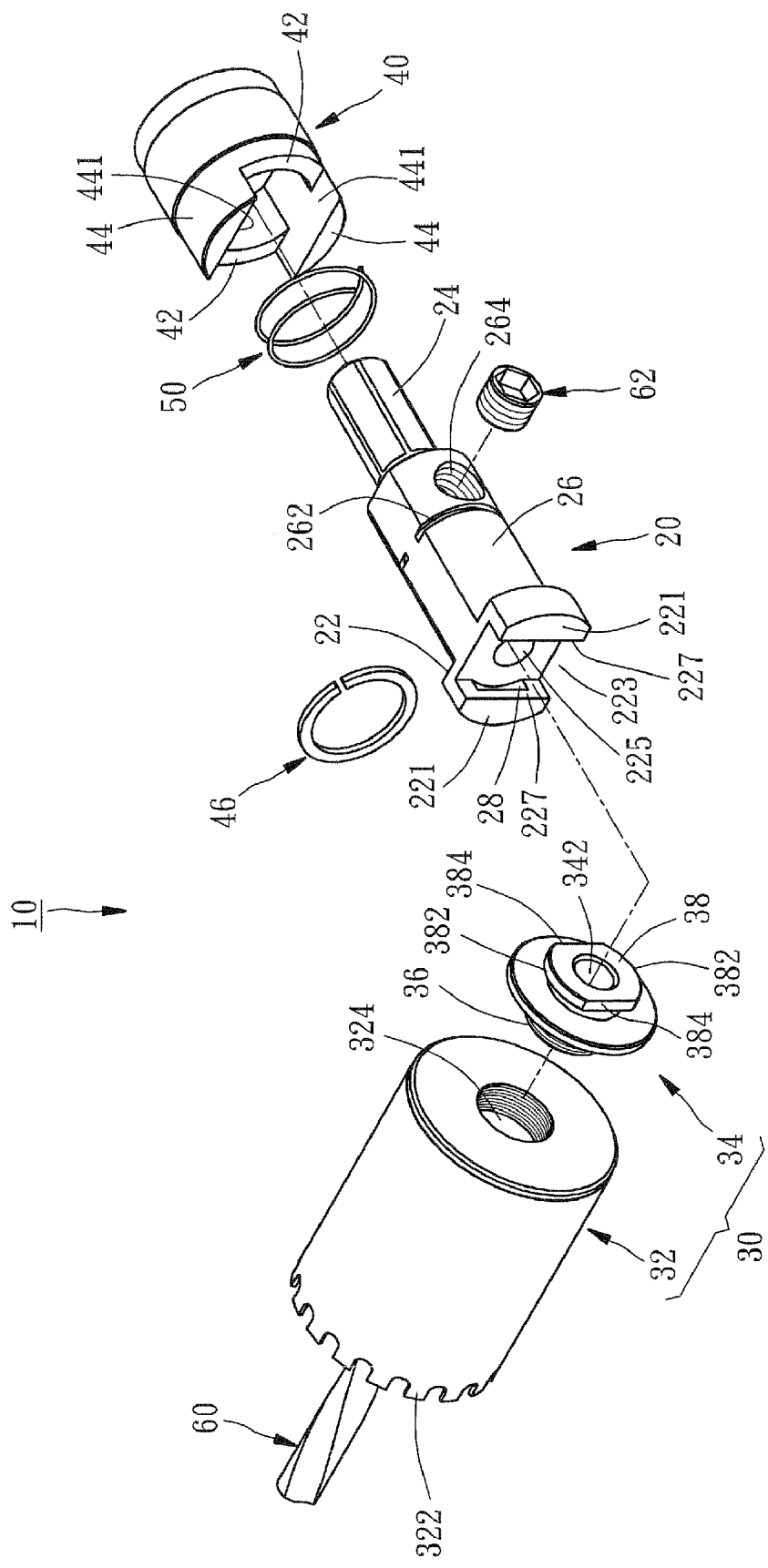
FIG. 1 is an exploded view of a hole saw according to a preferred embodiment of the present invention.
Figure 2:
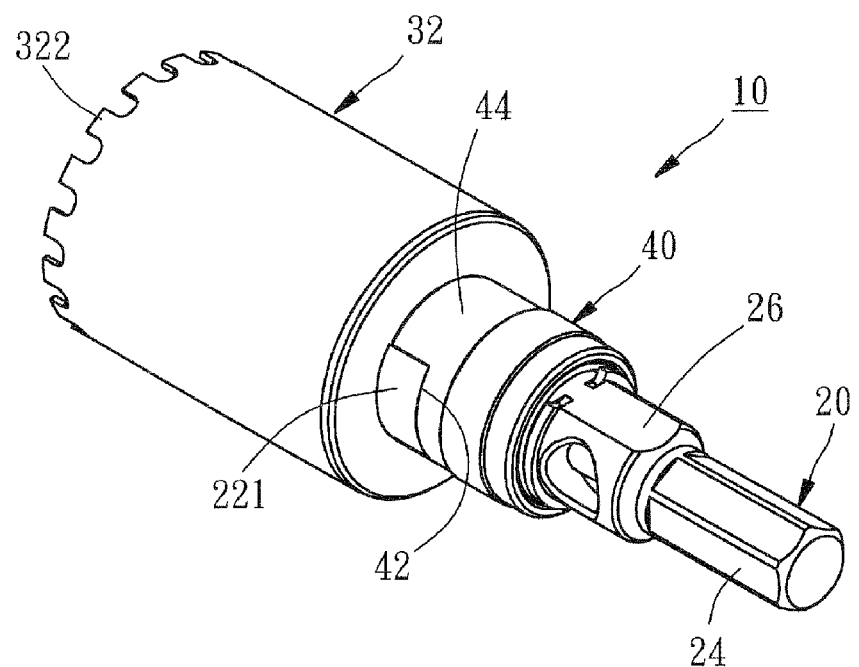
FIG. 2 is a perspective view of the hole saw according to the preferred embodiment of the present invention.

As shown in FIGS. 1 and 2, a hole saw 10 in accordance with a preferred embodiment of the present invention comprises an arbor 20, a saw blade assembly 30, a lid 40, an elastic member 50, and a drill 60.

The arbor 20 includes a coupling end 22, a transmission portion 24 capable of connecting a driving tool (not shown) such that the arbor 20 can be driven by the driving tool to rotate through the transmission portion 24, and a body portion 26 integrally connected with the coupling end 22 and the transmission portion 24 and provided with a C-shaped groove 262 and a first threaded hole 264 adjacent to the groove 262. The coupling end 22 has two opposite blocks 221, an indentation 223 located between the blocks 221, and a center hole 225 in communication with the indentation 223. The blocks 221 each have a first plane 227 to form a boundary of the indentation 223. Further, a first coupling portion 28, which is embodies as a curved depression, is recessed in each of the first planes 227.

The saw blade assembly 30 includes a saw blade 32 having a bottom end with a plurality of teeth 322 for sawing a workpiece and a top end with a second threaded hole 324 aligned with the center hole 225 of the arbor 20, and an adapter 34 having a bottom side with a threaded portion 36 threaded with the second threaded hole 324 for fastening the adapter 34 and the saw blade 32 together and a top side with a protrusion 38 that can be received in the indentation 223 of the arbor 20 and is provided with two second coupling portions 382 and two second planes 384. The second coupling portions 382, which are embodies as flanges, can be coupled to or disengaged from the first coupling portions 28 of the arbor 20 by means of the rotation of the saw blade assembly 30. The second planes 384 each have two ends respectively connected with one of two ends of the flange. Further, the adapter 34 has a through hole 342 aligned with the second threaded hole 324 of the saw blade 30 and the center hole 225 of the arbor 20.

Figure 3:
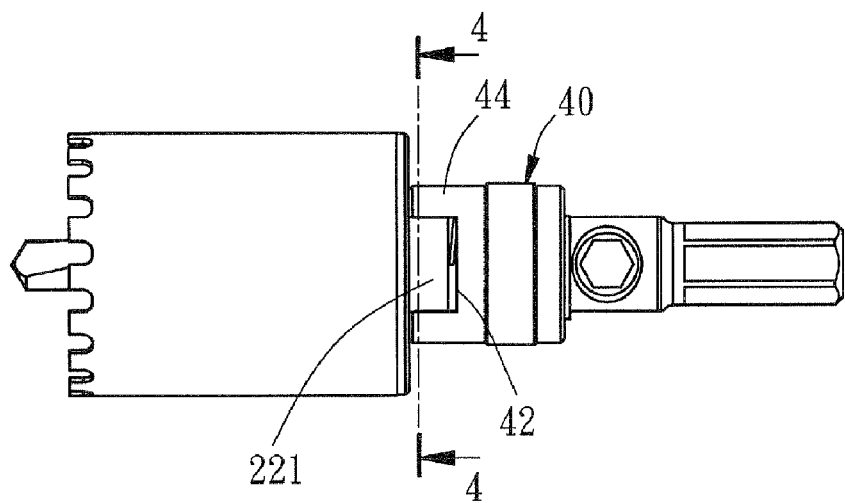
FIG. 3 is a lateral view of the hole saw according to the preferred embodiment of the present invention.
Figure 4:
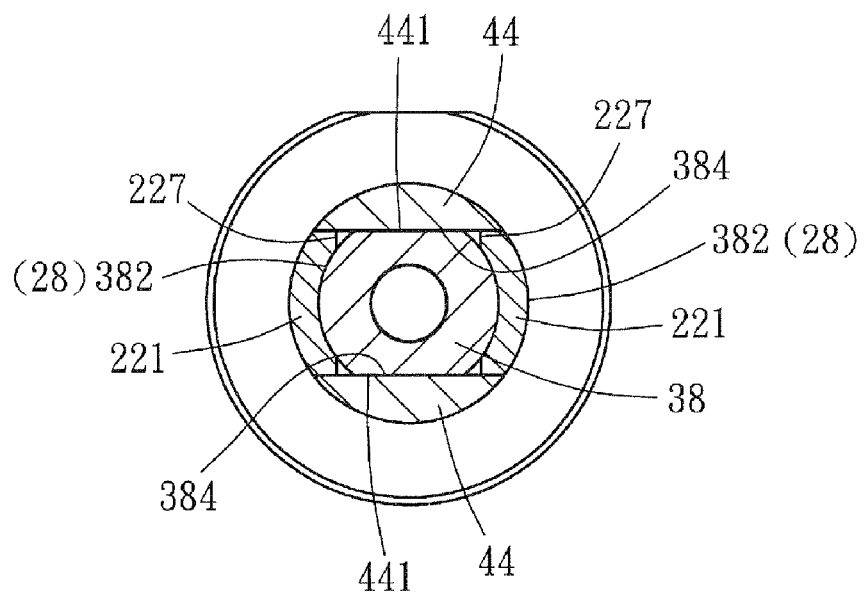
FIG. 4 is a sectional view taken along line 4-4 of FIG. 3, showing that the second coupling portions of the adapter are coupled to the first coupling portions of the arbor.
Figure 6:
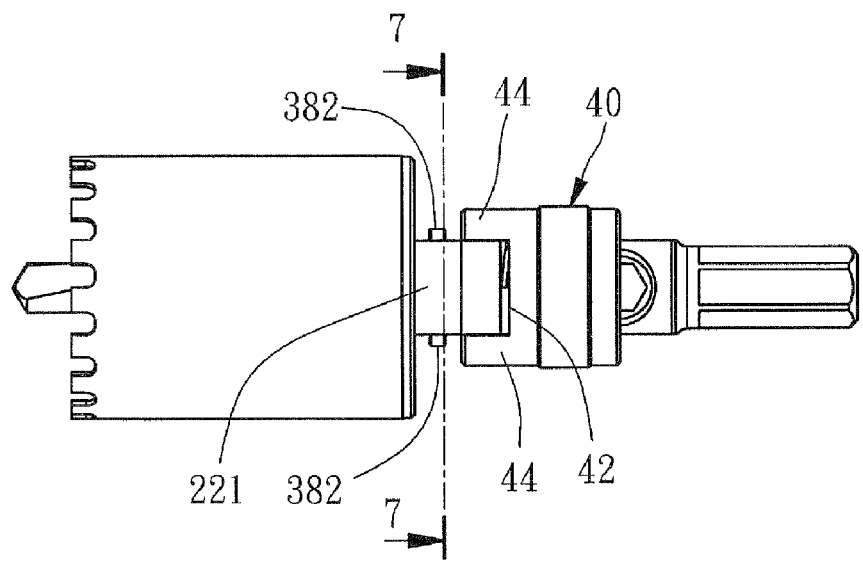
FIG. 6 is a lateral view of FIG. 5.
Figure 7:
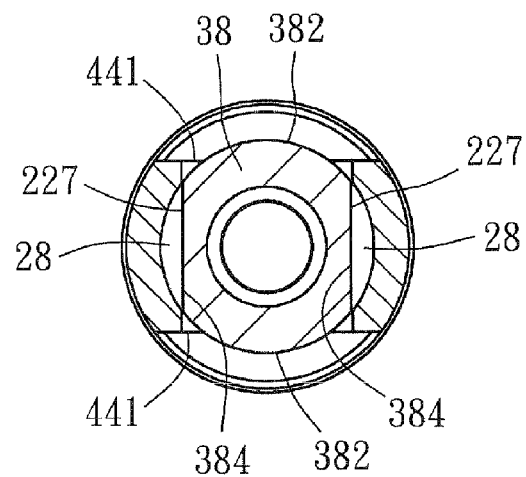
FIG. 7 is a sectional view taken along line 7-7 of FIG. 6, showing that the second coupling portions of the adapter are uncoupled from the first coupling portions of the arbor.

The lid 40 has two opposite notches 42 and two opposite block portions 44 staggered with the notches 42 and each having a third plane 441. The lid 40 is mounted on the body portion 26 of the arbor 20 through a C-shaped retaining ring 46 inserted in the groove 262 and movable relative to the arbor 20 between a first position and a second position. When the lid 40 is located at the first position, the blocks 221 of the arbor 20 are engaged with the notches 42 of the lid 40 and the block portions 44 of the lid 40 are respectively situated at one of two ends of the indentation 223 of the arbor 20 such that the second coupling portions 382 of the adapter 34 are blocked by the block portions 44 of the lid 40 and inserted in the first coupling portions 28, as shown in FIGS. 3 and 4, resulting in that the saw blade assembly 30 can't be rotatable relative to the arbor 20. When the lid 40 is located at the second position, the blocks 221 of the arbor 20 are disengaged from the notches 42 of the lid 40 and the block portions 44 of the lid 40 leave two ends of the indentation 223 of the arbor 20, as shown FIGS. 5 and 6, such that the block portions 44 of the lid 40 will not block the second portions 382 of the adapter 34, resulting in that the second portions 382 of the adapter 34 can be rotationally moved to depart from the first coupling portions 28 upon the rotation of the saw blade assembly 30, as shown in FIG. 7.

The elastic member 50 is sleeved on the body portion 26 of the arbor 20 and stopped against the lid 40 and the C-shaped retaining ring 46 for supplying an elastic force to move the lid 40 from the second position to the first position.

The drill 60 has one end passing through the second threaded hole 324 of the saw blade 32 and the through hole 342 of the adapter 34 and fixed in the center hole 225 of the arbor 20 by means of a screw 62 screwed to the first threaded hole 264 of the arbor 20 for positioning a center of the workpiece.

Figure 5:
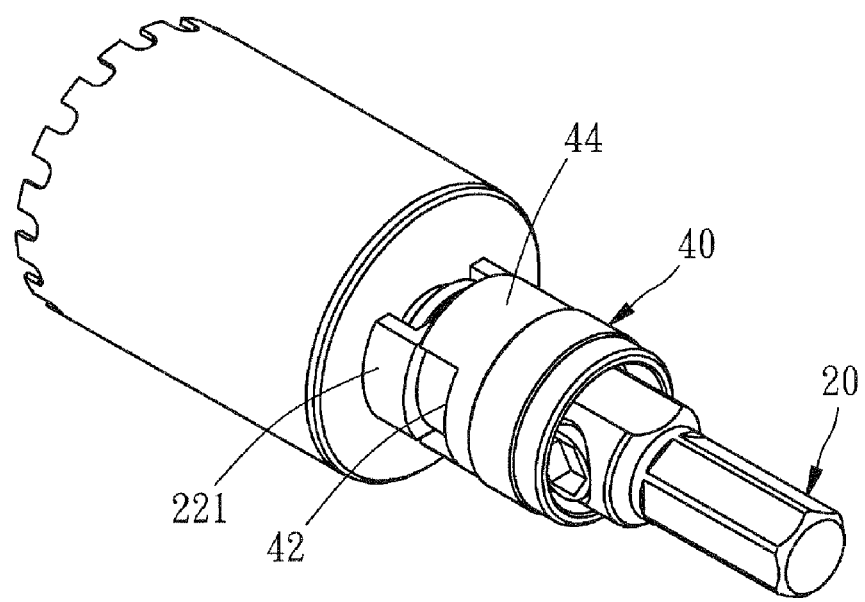
FIG. 5 is a perspective view of the hole saw according to the preferred embodiment of the present invention, showing that the lid is located at the second position.
Figure 8:
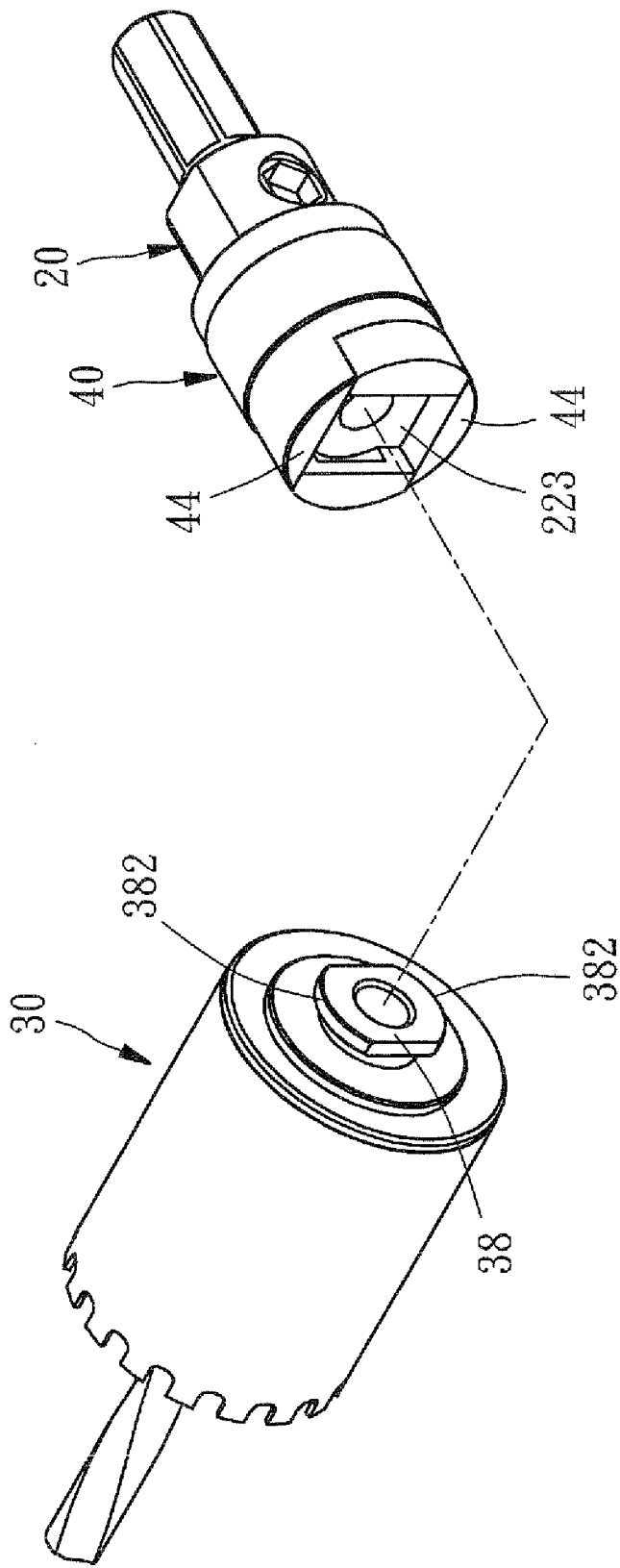
FIG. 8 is a partial exploded view of the hole saw according to the preferred embodiment of the present invention, showing that the saw blade assembly is disassembled from the arbor.

When a user would like to disassemble the saw blade assembly 30 from the arbor 20, he/she can force the lid 40 to move from the first position to the second position, as shown in FIG. 5, such that the block portions 44 of the lid 40 will leave two ends of the indentation 223 of the arbor 20, and then rotate the saw blade assembly 30 90 degrees to make the second coupling portions 382, i.e., the flanges, of the adapter 34 depart from the first coupling portions 28, i.e., the depressions, of the arbor 20. As a result, the second planes 384 of the protrusion 38 are parallel to the first planes 227 of the arbor 20 but vertical to the third planes 441 of the lid 40, as shown in FIG. 7, thereby the user can separate the saw blade assembly 30 from the arbor 20, as shown in FIG. 8.

On the contrary, when the user would like to assemble the saw blade assembly 30 with the arbor 20, the user can press the protrusion 38 of the adapter 34 into the indentation 223 of the arbor 20 in such a way that the second coupling portions 382 of the adapter 34 push the block portions 44 of the lid 40 to move the lid 40 from the first position to the second position. Next, the user can rotate the saw blade assembly 30 90 degrees to make the second coupling portions 382, i.e., the flanges, of the adapter 34 insert in the first coupling portions 28, i.e., the depressions, of the arbor 20, as shown in FIG. 4. As a result, the second planes 384 of the protrusion 38 are vertical to the first planes 227 of the arbor 20 but parallel to the third planes 441 of the lid 40, as shown in FIG. 4; and further, the lid 40 will be moved from the second position to the first position by the elastic force of the elastic member 50, as shown in FIGS. 2 and 3, to make the block portions 44 of the lid 40 block the second coupling portions 382 of the adapter 34. Accordingly, the saw assembly 30 is unrotatable relative to the arbor 20 but drivable by the driving tool to rotate through the transmission portion 24 of the arbor 20.

In conclusion, the saw blade assembly can be securely connected with the arbor by means of the first coupling portions and the second coupling portions to reduce unnecessary vibration and enhance working accuracy, and furthermore the saw blade assembly can be quickly assembled with and disassembled from the arbor by the movement of the lid and the rotation of the saw blade assembly, thereby enhancing convenience of assembly and disassembly works. Besides, the number of the first planes and the second planes are not limited to the above-mentioned embodiment as long as the first planes and the second planes can be matched with each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hole saw comprising:
an arbor having a body portion and a coupling end connected with said body portion and provided with an indentation, a center hole in communication with said indentation, and two opposite first coupling portions at a boundary of said indentation;
a saw blade assembly having a saw blade and an adapter connected with said saw blade and provided with a through hole aligned with said center hole of said arbor and a protrusion received in said indentation of said arbor with two opposite second coupling portions;
a lid provided with at least one block portion and movably mounted on said body portion of said arbor and movable relative to said arbor between a first position where said second coupling portions of said adapter are blocked by said block portion and coupled to said first coupling portions of said arbor such that said saw blade assembly can't be rotatable relative to said arbor, and a second position where said second coupling portions of said adapter and said block portion are staggered such that said second coupling portions of said adapter are uncoupled from said first coupling portions of said arbor through the rotation of said saw blade assembly; and
a drill having one end passing through said through hole of said adapter and inserted in said center hole of said arbor.

2. The hole saw as claimed in claim 1, wherein said first coupling portions of said arbor are depressions, and said second coupling portions of said adapter are flanges inserted in said depressions.

3. The hole saw as claimed in claim 2, wherein said indentation is located between two blocks of said coupling end of said arbor; said blocks each having a first plane, in which each of said depressions is recessed, to form said boundary of said indentation; said protrusion of said adapter including two opposite second planes, each of which has two ends respectively connected with one of two ends of each of said flanges and is vertical to said first planes of said blocks when said flanges are inserted in said depressions and is parallel to said first planes of said blocks when said flanges leave said depressions.

4. The hole saw as claimed in claim 3, wherein said lid has two said block portions, each of which is located at one of two ends of said indentation of said arbor when said flanges are inserted in said depressions, and leaves one of two ends of said indentation of said arbor when said flanges leave said depressions, and is provided with a third plane parallel to said second plane of said adapter when said flanges are inserted in said depressions and vertical to said second plane of said adapter when said flanges leave said depressions.

5. The hole saw as claimed in claim 4, wherein said lid has two opposite notches staggered with said blocks and engaged with said blocks of said arbor when said lid is located at said first position and disengaged from said blocks of said arbor when said lid is located at said second position.

6. The hole saw as claimed in claim 1, wherein said body portion of said arbor has a groove for insertion of a C-shaped retaining ring.

7. The hole saw as claimed in claim 6, further comprising an elastic member sleeved on said body portion of said arbor and stopped against said lid and said C-shaped retaining ring to move said lid from said second position to said first position.

8. The hole saw as claimed in claim 1, further comprising a screw screwed to a threaded hole of said arbor in communication with said center hole for fastening said drill.

9. The hole saw as claimed in claim 1, wherein said arbor has a transmission portion connected with said body portion.

* * * * *